(12) United States Patent
Milne

(10) Patent No.: US 8,881,388 B2
(45) Date of Patent: Nov. 11, 2014

(54) METHOD AND APPARATUS FOR MAKING CAPACITIVE TOUCH PANELS

(75) Inventor: David Charles Milne, Chipping Norton (GB)

(73) Assignee: M-Solv Ltd., Oxford (GB)

( * ) Notice: Subject to any disclaimer, the term of this patent is extended or adjusted under 35 U.S.C. 154(b) by 333 days.

(21) Appl. No.: 13/389,843

(22) PCT Filed: Sep. 29, 2009

(86) PCT No.: PCT/GB2009/002318
§ 371 (c)(1),
(2), (4) Date: Mar. 15, 2012

(87) PCT Pub. No.: WO2011/018595
PCT Pub. Date: Feb. 17, 2011

(65) Prior Publication Data
US 2012/0169664 A1 Jul. 5, 2012

(30) Foreign Application Priority Data
Aug. 11, 2009 (GB) .................. 0914074.0

(51) Int. Cl.
*H05K 3/02* (2006.01)
*B23K 26/40* (2014.01)
*B23K 26/067* (2006.01)
*G06F 3/044* (2006.01)
*B23K 26/06* (2014.01)

(52) U.S. Cl.
CPC ......... *B23K 26/0621* (2013.01); *B23K 26/0676* (2013.01); *B23K 26/409* (2013.01); *G06F 3/044* (2013.01); *G06F 2203/04103* (2013.01)
USPC ................. 29/847; 219/121.67; 219/121.68; 219/121.69

(58) Field of Classification Search
CPC ............................... G06F 3/044; H05K 3/027
USPC ............. 29/847; 219/121.67, 121.68, 121.69; 345/174
See application file for complete search history.

(56) References Cited

U.S. PATENT DOCUMENTS

| | | | |
|---|---|---|---|
| 5,702,565 A | 12/1997 | Wu et al. | |
| 6,300,594 B1 * | 10/2001 | Kinoshita et al. | ........ 219/121.69 |
| 6,781,089 B2 * | 8/2004 | Umetsu et al. | ........... 219/121.68 |
| 6,858,461 B2 | 2/2005 | Oswald et al. | |
| 7,241,967 B2 * | 7/2007 | Umetsu et al. | ........... 219/121.67 |

FOREIGN PATENT DOCUMENTS

EP   0 938 135   8/1999

OTHER PUBLICATIONS

International Search Report issued in PCT Application No. PCT/GB2009/002318 dated Mar. 28, 2011.

* cited by examiner

*Primary Examiner* — Evan Pert
(74) *Attorney, Agent, or Firm* — KED & Associates LLP

(57) ABSTRACT

An apparatus for laser scribing two transparent electrically conductive layers (72A,B; 73A,B) deposited on opposite surfaces of a transparent substrate (71A; 71B) comprising; a laser beam (74A), one or more lenses (75A, 76A, 77A) configured and positioned for adjusting the focal spot (78A; 78B) of the laser beam between a first position (78A) and a second position (78B), means for holding a substrate in a plane between the first and second position and means for moving the relative positions of the substrate (71A; 71B) and laser beam (74A) in two dimensions within the plane or a plane parallel to it, wherein in use, the first and second positions (78A; 78B) coincide with or are adjacent to exposed surfaces of the two transparent electrically conducting layers (72A,B; 73A,B).

14 Claims, 5 Drawing Sheets

METHOD AND APPARATUS FOR MAKING CAPACITIVE TOUCH PANELS

The present invention relates to a method for manufacture of capacitive touch panels, in particular the method relates to the scribing of electrodes on the two conductive layers of a two layer projective capacitive touch panel.

Capacitive touch panel technology is in wide use, for example in mobile phones, satellite navigation systems, PDA screens and handheld games consoles.

One particular form of capacitive touch panel is known as projective capacitive touch technology or "PCT". In PCT devices, an XY array of sensing electrodes is formed in layers of transparent conducting material. In use, capacitance forms between the user's fingers and the projected capacitance from the sensing electrodes. A touch is made, precisely measured and translated into a command which is executed by underlying electronic devices for an appropriate software application. PCT screens enjoy the benefits of responding accurately to both fingers and styli.

One particular form of PCT technology has two separated layers of transparent conducting material and it is the changes in the mutual-capacitance between the electrodes at the intersection points of the electrode array layer that are detected.

The layers of transparent conductive material are each divided into a plurality of discrete electrode cells which are electrically connected in a first orthogonal direction but electrically isolated in a second orthogonal direction. The scribed pattern may be the same for both layers or may be different.

Conventionally, in a capacitive touch panel using PCT technology, a transparent substrate has deposited on each of its opposite surfaces a layer of transparent electrically conducting material. An electrode pattern is scribed in each of the layers of transparent electrically conducting material using two separate lasers. Alternatively, the substrate may need to be turned over and the device recalibrated to carry out the scribing process for the second layer. Where the electrode pattern is desired to be identical on the two surfaces, a single laser can be focused between the two layers and its parameters selected to provide scribing in each of the two layers simultaneously without damage to the transparent substrate. It will be appreciated this one laser process cannot be used to provide different patterns on the two layers.

The present invention aims to provide a novel and efficient process for providing scribing of different electrode patterns on both of the electrically conductive layers of a PCT touch panel, without the need for a second laser.

In accordance with the present invention there is provided a method for laser scribing two transparent electrically conductive layers deposited on opposite surfaces of a transparent substrate comprising:
1. directing a laser beam through one or more lenses to a first focal spot on or closely adjacent an exposed surface of a first of the two layers;
2. initiating relative movement between the laser and the substrate in two axes in a plane orthogonal to the axis of the laser beam whereby to scribe an electrode pattern on the first of the two layers;
3. repositioning the one or more lenses and focusing the laser beam at a second focal spot on or closely adjacent an exposed surface of the second of the two layers;
4. initiating relative movement between the laser and the substrate in two axes in a plane orthogonal to the axis of the laser beam whereby to scribe an electrode pattern on the second of the two layers.

In a simple embodiment, step 3 involves a single lens positioned along the laser beam axis between the point of emergence of the laser beam and the substrate and is moved along the axis of the laser beam so as to adjust the position of the focal spot. In a more complex embodiment two or more lenses are aligned in place of the single lens and step 3 involves adjusting the separation between two or more of the lenses.

In an alternative embodiment the one or more lenses may be positioned to interrupt the laser beam before it emerges and repositioning of the one or more lenses alters the divergence of the beam and hence the focal spot of the emergent beam relative to the substrate.

It will be appreciated that combinations of beam diameter, beam power, pulse energy and lens focal length are pre selected to ensure the focal spots in the desired positional range are achievable. The inventors have found practical embodiments of apparatus for performing the method can be achieved using a laser pulse length in the range 1 to 100 ns and a laser wavelength of 250-360 nm UV or 1040 to 1075 nm IR. Lasers operating in the visible region around 532 nm have also been found appropriate. In addition, it is believed that pulsed lasers that operate with pulse lengths in the sub-nanosecond (ps) range may be appropriate for this method, it is recognized however that the pulse length should not be so short as to create a very high intensity inside the substrate when the beam is processing the second side since this may cause damage to the substrate.

A specific example of operating conditions that have been shown to work satisfactorily are; soda lime glass of 0.55 mm thickness with ITO deposited to a surface resistivity of 100 ohms per square on opposite sides, a laser beam with a repetition rate of 100 kHz, a power of 0.5 W, a wavelength of 1064 nm, a diameter of 12 mm, focused by a lens with focal length of 100 mm to a focal spot of 12 microns diameter and moved at a beam speed of 400 mm/sec over the substrate surface. In this case it has been shown that it is possible to focus on the top surface of the glass substrate and remove the ITO layer on that surface cleanly without damaging the substrate and without damaging the ITO on the lower side of the substrate and then refocus the beam on the lower surface and remove the ITO layer on that surface cleanly without damaging the substrate and without damaging the ITO on the upper side of the substrate.

The electrode pattern of steps 2 and 4 may be the same or different.

The relative movement of steps 2 and 4 may be achieved through movement of the substrate against a stationary laser or movement of the laser against a stationary substrate.

In another aspect, the invention provides an apparatus for laser scribing two transparent electrically conductive layers deposited on opposite surfaces of a transparent substrate comprising; a laser beam, one or more lenses configured and positioned for adjusting the focal spot of the laser beam between a first position and a second position, means for holding a substrate in a plane between the first and second position and means for moving the relative positions of the substrate and laser beam in two dimensions within the plane or a plane parallel to it, wherein the first and second positions coincide with or are adjacent to exposed surfaces of the two transparent electrically conducting layers.

In one simple embodiment a single lens is positioned on the axis of the laser beam between its point of emergence and the focal spot and is configured to be moved along the axis.

In an alternative embodiment, multiple lenses are positioned on the axis of the laser beam between its point of emergence and the focal spot and are configured to have their separation adjusted along the axis.

In an alternative embodiment, the divergence of the laser beam and hence the position of the focal spot is adjusted by repositioning of one or more lenses in the beam prior to its emergence. For example, the beam may emerge from a telescope which incorporates an adjustable lens system. Optionally, the laser beam is directed to emerge from a two axis scanner unit.

In order to better explain the invention, examples of the known prior art and the applicant's invention will now be further described with reference to the accompanying drawings in which.

Figure 1:
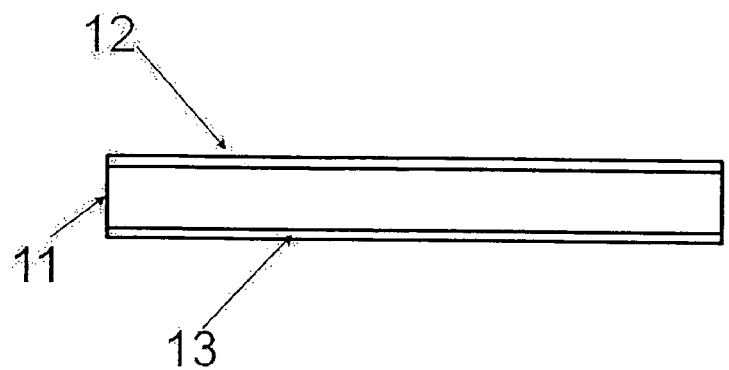
FIG. 1 shows a PCT touch panel as known from the prior art.

FIG. 1 shows the substrate used for a typical two layer capacitive touch panel. The substrate 11 is transparent and may be rigid and made of glass or other inorganic transparent material (eg silica) or may be flexible and made of a polymer such as Polyester (PET) or polycarbonate (PC). The thickness of the substrate can range from a fraction of a mm to many mm. A layer that is both transparent and electrically conducting is applied to both sides 12, 13 of the substrate. Typically these are thin layers of an inorganic oxide material such as Indium Tin Oxide (ITO), Tin Oxide (SnO2), Zinc Oxide (ZnO) or other transparent conductive oxides (TCO). Other transparent conducting layers based on organic materials or nano-particle materials may be used as an alternative. Typical layer thicknesses are sub micron. Surface resistivities lie in the range 100 to a several hundred ohms per square. We refer to these transparent conducting materials as TCMs from now on in this specification.

Figure 2:
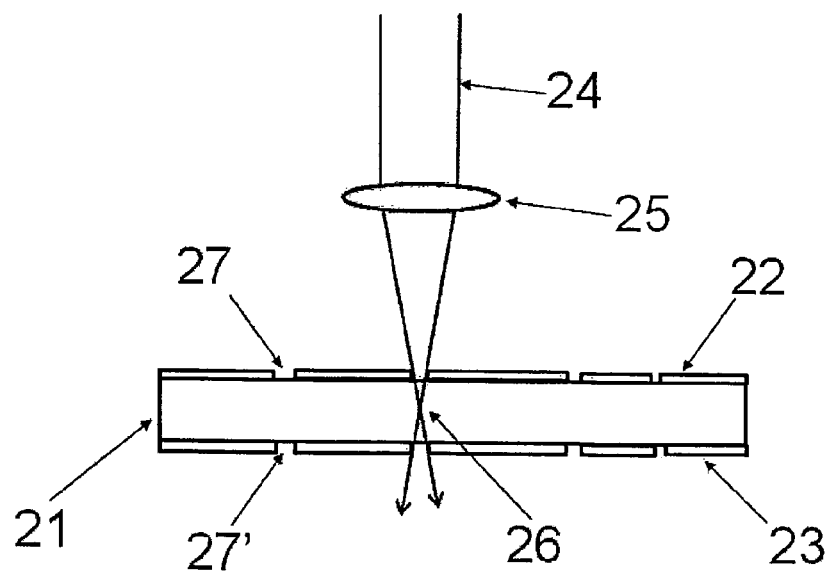
FIG. 2 shows a first prior art method for scribing identical electrode patterns on the conducting layers of the PCT of FIG. 1.

FIG. 2 illustrates prior art as known from, for example, JP8320638A and US2008129318A. It shows how a focused laser beam is used to scribe lines through two TCM coatings on opposite sides of a substrate simultaneously. The substrate 21 has a TCM layer on the first side 22 and another TCM layer on the second side 23. A pulsed laser beam 24 is focused by a lens 25 to a point 26 somewhere between the two layers. The laser wavelength is chosen so that the beam can pass through the substrate without significant absorption but that some laser energy is absorbed in the TCM layers. The laser power and pulse energy is adjusted so that the TCM layer is ablated and removed on both sides of the substrate but the substrate is essentially undamaged. The substrate and laser beam are moved relative to each other in two axes in a plane perpendicular to the laser beam axis to scribe lines to create the required electrically isolated electrode patterns on both sides of the substrate. Because the TCM layers on both sides are processed simultaneously the scribe pattern 27 on the first side must necessarily be identical to that 27' on the second side.

Figure 3:
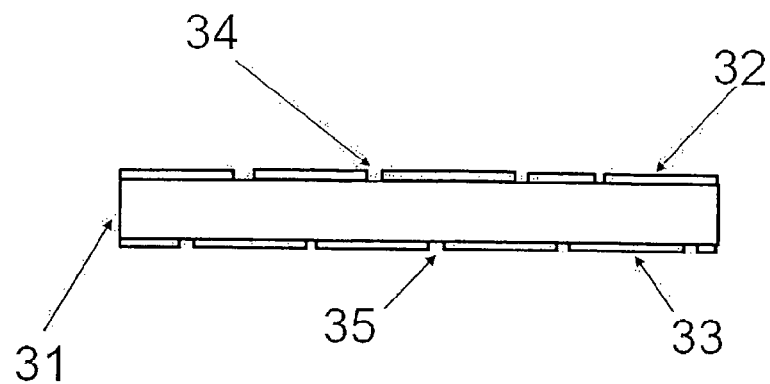
FIG. 3 shows a PCT touch panel requiring different electrode patterns on the conducting layers.

FIG. 3 shows the end product which the present invention aims to produce in an efficient manner with a single laser. The substrate 31 has a TCM layer on the first side 32 and another on the second side 33. It is required to scribe a pattern of isolating lines in the TCM layer on the first side 34 that is different to the pattern of lines in the TCM layer on the second side 35.

Figure 4:
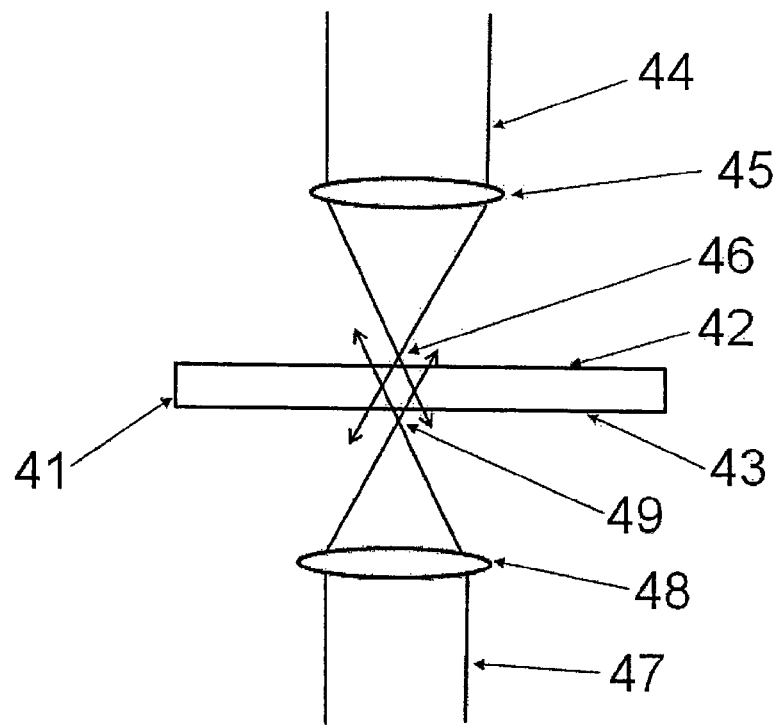
FIG. 4 shows a second prior art method for scribing different electrode patterns on the conducting layers of the PCT of FIG. 3.

FIG. 4 this is illustrates the applicants own prior art as described in UK Patent application no. 0803305.2 and shows a method for scribing different patterns of isolating lines in the TCM layers on opposite sides of a substrate. The substrate 41 has a TCM layer on the first side 42 and another on the second side 43. A first pulsed laser beam 44 is directed to the first side 42. The beam is focused by a lens 45 to a point 46 on or before the TCM layer on the first side 42. The parameters of the laser beam are set to ablate the TCM layer on the first side. The substrate and first laser beam 44 are moved relative to each other in two axes in a plane perpendicular to the laser beam axis to scribe the required pattern of isolating lines in the TCM layer on the first side of the substrate. After the focus of the first beam 46 the beam diverges through the substrate so the power or energy density in the beam is well below that required to ablate the TCM layer on the second side. A second pulsed laser beam 47 is directed to the second side substrate surface. The beam is focused by a lens 48 to a point 49 on or below the TCM layer on the second side. The parameters of the laser beam are set to ablate the TCM layer on the second side. The substrate and second laser beam are moved relative to each other in two axes in a plane perpendicular to the laser beam axis to scribe the required pattern of isolating lines in the TCM layer on the second side of the substrate. After the focus of the second beam 49, the beam diverges through the substrate so the power or energy density in the beam is well below that required to ablate the TCM layer on the first side. Both beams can be operated at the same time to create the separate patterns.

Figure 5:
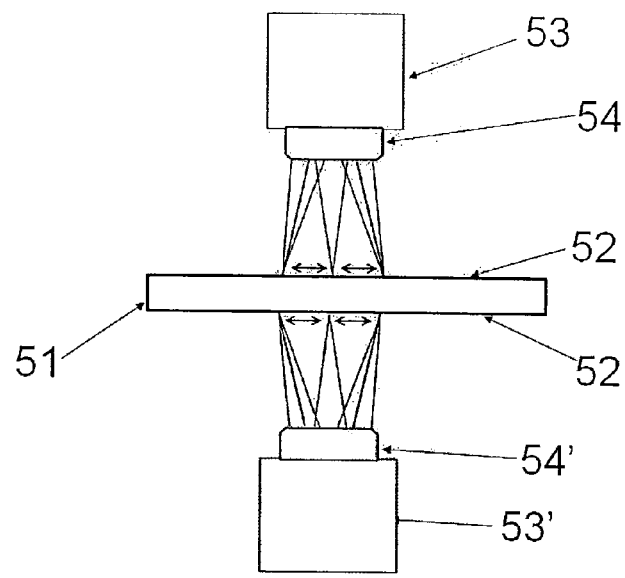
FIG. 5 shows a third prior art method for scribing different electrode patterns on the conducting layers of the PCT of FIG. 3.
Figures 6A, 6B:
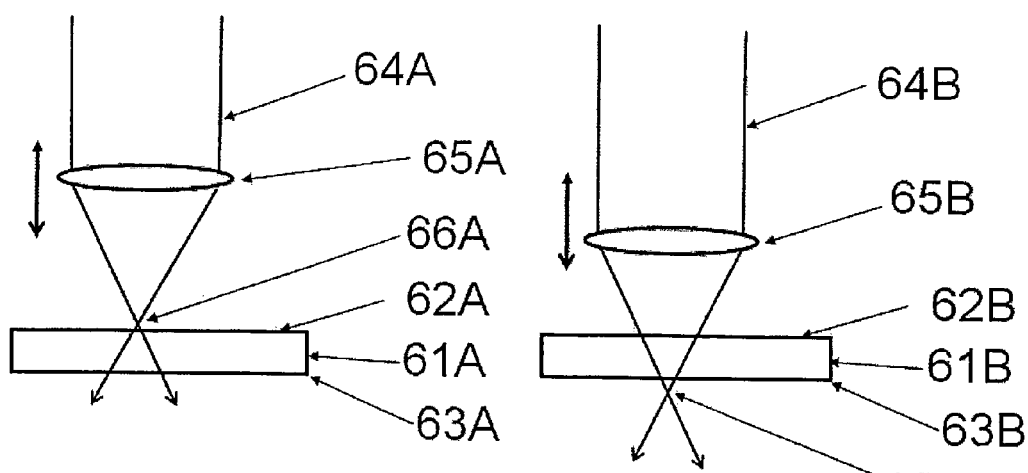
FIGS. 6A and 6B show a first embodiment of a novel method in accordance with the invention.

FIG. 5 shows in more detail equipment which may be used to perform the prior art method of FIG. 4. As can be seen, scanners are used to cause the relative motion between the substrate and the laser beams. The substrate 51 has a TCM layer on the first side 52 and another on the second side 52'. A scanner unit 53 on the first side moves a first pulsed laser beam in two directions to cover an area on the substrate. A lens 54 focuses the first pulsed beam on or just before the first surface to cause the TCM layer on that side to be scribed with a first pattern. At the same (or later time) a scanner unit 53' on the second side moves a second pulsed laser beam in two directions to cover an area on the second side of the substrate. A lens 54' focuses the second pulsed beam on or before the second surface to cause the TCM layer on that side to be patterned with a second pattern. Both first and second beams diverge after being focused and hence the power or energy density in each beam at the opposite surface of the substrate is well below that necessary to ablate the TCM layer FIGS. 6A and 6B illustrate the two stages of the proposed novel method. Transparent substrates 61A and 61B have a TCM layer on the first side 62A and 62B and another TCM layer on the second side 63A and 63B. FIG. 6A shows a first process step where pulsed laser beam 64A is focused by lens 65A to a point 66A. The relative positions of the substrate 61A and the lens 65A are set so that the focal spot of the beam 66A is on or just before the first surface. The laser beam diameter and lens focal length and the laser beam power and pulse energy properties are such that the laser ablates the TCM layer on the first side but not on the second side. The substrate is moved relative to the laser beam in two axes in a plane perpendicular to the laser beam axis so that a first pattern is scribed in the TCM layer on the first side.

FIG. 6B shows the second process step where the distance from the lens 65B to the substrate 61B is reduced so that the laser beam 64B passes through the transparent substrate and comes to a focus at a point 66B at or just beyond the TCM layer on the second side. The laser beam diameter and lens focal length and the laser beam power and pulse energy properties are such that the laser ablates the TCM layer on the second side but not on the first side. The substrate is moved relative to the laser beam in 2 axes in a plane perpendicular to the laser beam axis so that a second pattern is scribed in the TCM layer on the second side. The patterns on both sides are usually different but might also be the same.

The sequence in which the sides are patterned does not matter. Either the first side can be processed before the second or alternatively the second side can be patterned before the first. The distance between the lens and the substrate is changed by either motion of the lens or motion of the substrate (or both) along the laser axis. This motion is usually servo controlled.

Figure 7A:
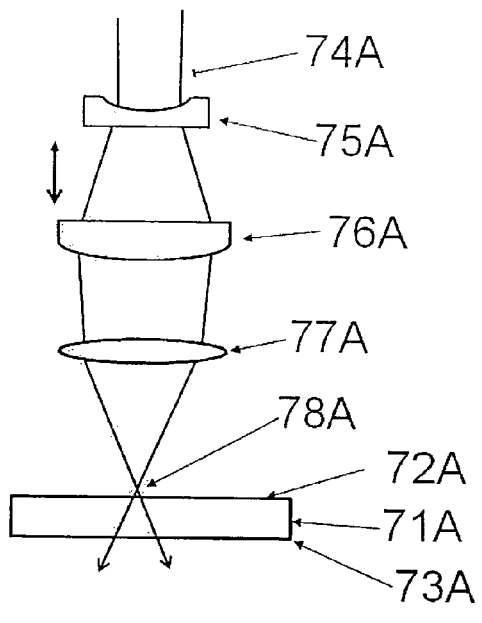
FIGS. 7A and 7B show a second embodiment of a novel method in accordance with the invention.
Figure 7B:
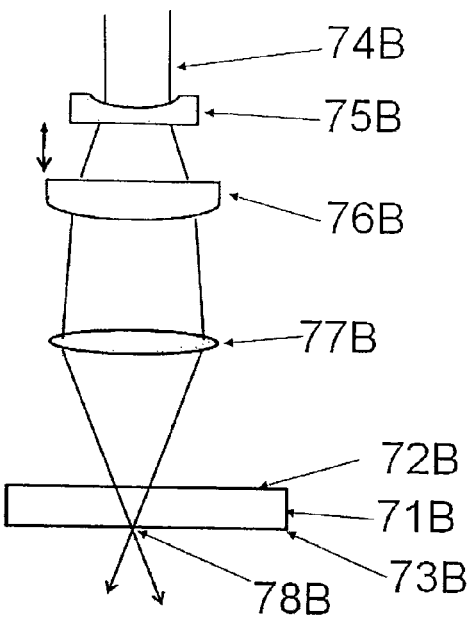

FIGS. 7A and 7B shows an alternative way to carry out the two stage process shown in FIGS. 6A and 6B. Transparent substrates 71A and 71B have a TCM layer on the first side 72A and 72B and another TCM layer on the second side 73A and 73B. FIG. 7A shows a first process step where a pulsed laser beam 74A is passed through a telescope consisting of a diverging lens 75A and a converging lens 76A. The separation between the 2 telescope components is adjustable so that the divergence of the beam following the telescope can be varied. Following the telescope the beam is focused by lens 77A to a point 78A. The separation of the two lenses in the telescope is set so that the focal spot of the beam 78A is on or just before the first surface. The laser beam diameter and lens focal length and the laser beam power and pulse energy properties are such that the laser ablates the TCM layer on the first side but not on the second side. The substrate is moved relative to the laser beam in two axes in a plane perpendicular to the laser beam axis so that a first pattern is scribed in the TCM layer on the first side.

FIG. 7B shows the second process step where the separation between the first telescope lens 75B and the second telescope lens 76B is reduced so that the laser beam 74B after passing through the telescope is caused to diverge compared to that shown in FIG. 7A so that the focal spot 78B created by the focus lens 77B moves further from the lens such that it passes through the transparent substrate and comes to a focus at a point 78B at or just beyond the TCM layer on the second side. The laser beam diameter and lens focal length and the laser beam power and pulse energy properties are such that the laser ablates the TCM layer on the second side but not on the first side. The substrate is moved relative to the laser beam in two axes in a plane perpendicular to the laser beam axis so that a second pattern is scribed in the TCM layer on the second side. The patterns on both sides are usually different but might also be the same.

Only one of the telescope lens components needs to be moved to change the beam divergence and move the focal plane position. This motion may be servo controlled. The sequence in which the sides are patterned does not matter. Either the first side can be processed before the second or alternatively the second side can be patterned before the first.

Figure 8A:
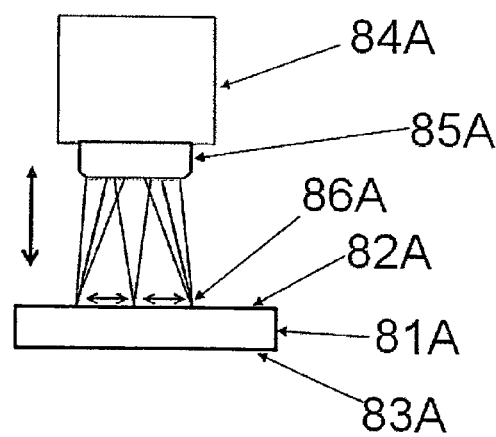
FIGS. 8A and 8B show a third embodiment of a novel method in accordance with the invention.
Figure 8B:
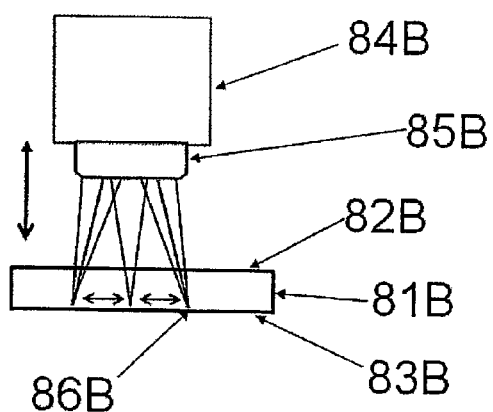

FIGS. 8A & 8B show a method similar to that shown in FIGS. 7A and 7B wherein scanners are used to cause the relative motion between the substrate and the laser beams in the plane parallel to the substrate surface. The substrate 81A and 81B has a TCM layer on the first side 82A and 82B and another on the second side 83A and 83B. FIG. 8A shows a first step where scanner unit 84A on the first side moves a pulsed laser beam in two directions to cover an area on the substrate. A lens 85A focuses the pulsed beam to a point 86A on or just before the first surface to cause the TCM layer on that side to be ablated. The laser beam diameter and lens focal length and the laser beam power and pulse energy properties are such that the laser ablates the TCM layer on the first side but not on the second side. When the scanner is operated the focused beam is moved over the substrate to create a pattern in the TCM layer on the first side.

FIG. 8B shows the second process step where the distance from the lens 85B to the substrate 81B is reduced so that the laser beam passes through the transparent substrate and comes to a focus at a point 86B at or just beyond the TCM layer on the second side. The laser beam diameter and lens focal length and the laser beam power and pulse energy properties are such that the laser ablates the TCM layer on the second side but not on the first side. The scanner moves the focal spot over the second surface in two axes so that a pattern is formed in the TCM layer on the second side.

Most conveniently, the method can provide a different pattern on each side, though it will be appreciated the method can just as conveniently be used to provide identical patterns on the two side. The sequence in which the sides are patterned does not matter. Either the first side can be processed before the second or alternatively the second side can be patterned before the first. The distance between the lens/scanner unit and the substrate is changed by either motion of the lens/scanner or motion of the substrate (or both) along the laser axis. This motion is conveniently servo controlled.

Figure 9A:
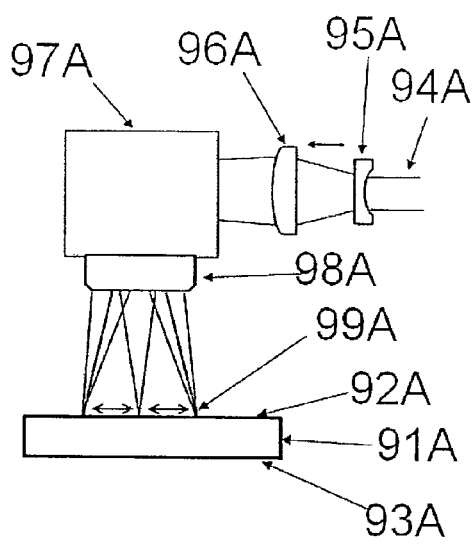
FIGS. 9A and 9B show a fourth embodiment of a novel method in accordance with the invention.
Figure 9B:
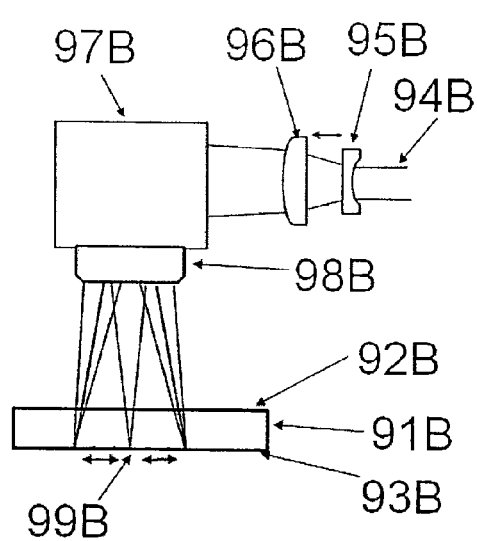

FIGS. 9A & 9B shows a specific example of the method of the invention wherein scanners are used to move the beam over the substrate surface much as already described in relation to FIGS. 8A and 8B, but wherein a telescope with variable separation is used to control the position of the focus along the laser beam axis. The substrates 91A and 91B have a TCM layer on the first side 92A and 92B and another on the second side 93A and 93B. FIG. 9A shows a first step where a pulsed laser beam 94A is passed through a telescope consisting of a diverging lens 95A and a converging lens 96A. The separation between the two telescope components is adjustable so that the divergence of the beam following the telescope can be varied. On exiting the telescope the beam passes through a two axis scanner unit 97 and is then focused by lens 98A to a point 99A. The separation of the two lenses in the telescope is set so that the focal spot of the beam 99A is on or just before the first surface. The laser beam diameter and lens focal length and the laser beam power and pulse energy properties are such that the laser ablates the TCM layer on the first side but not on the second side. When the scanner is operated the focused beam is moved over the substrate to create a pattern in the TCM layer on the first side.

FIG. 9B shows the second process step where the separation between the first telescope lens 95B and the second telescope lens 96B is reduced so that the laser beam 94B is caused to diverge compared to that shown in FIG. 9A so that the focal spot 99B created by the focus lens 98B moves further from lens such that it passes through the transparent substrate and comes to a focus at a point 99B at or just beyond the TCM layer on the second side. The laser beam diameter and lens focal length and the laser beam power and pulse energy properties are such that the laser ablates the TCM layer on the second side but not on the first side. The scanner moves the focal spot over the surface in two axes so that a pattern is formed in the TCM layer on the second side.

The patterns on both sides are usually different but can also be the same. The sequence in which the sides are patterned does not matter. Either the first side can be processed before the second or alternatively the second side can be patterned before the first.

The invention claimed is:

1. A method for laser scribing two transparent electrically conductive layers deposited on opposite surfaces of a transparent substrate comprising:
   1. directing a laser beam through one or more lenses to a first focal spot on or closely adjacent an exposed surface of a first of the two layers;
   2. initiating relative movement between the laser and the substrate in two axes in a plane orthogonal to the axis of the laser beam whereby to scribe an electrode pattern on the first of the two layers;
   3. repositioning the one or more lenses and focusing the laser beam through the transparent substrate at a second focal spot on or closely adjacent an exposed surface of the second of the two layers;
   4. initiating relative movement between the laser and the substrate orthogonal to the axis of the laser beam whereby to scribe an electrode pattern on the second of the two layers.

2. A method as claimed in claim 1 wherein step 3 involves a single lens positioned along the laser beam axis between the point of emergence of the laser beam and the substrate and is moved along the axis of the laser beam so as to adjust the position of the focal spot.

3. A method as claimed in claim 1 wherein step 3 involves providing two or more lenses and adjusting the separation between two or more of the lenses to adjust the position of the focus spot.

4. A method as claimed in claim 1 involving positioning one or more lenses to interrupt the laser beam before it emerges and repositioning the one or more lenses to alter the divergence of the beam and hence the focal spot of the emergent beam relative to the substrate.

5. A method as claimed in claim 1 wherein the electrode pattern of steps 2 and 4 is different.

6. A method as claimed in claim 1 wherein the relative movement of steps 2 and 4 is achieved through movement of the substrate against a stationary laser beam.

7. A method as claimed in claim 1 wherein the relative movement of steps 2 and 4 is achieved through movement of the laser beam against a stationary substrate.

8. An apparatus for laser scribing two transparent electrically conductive layers deposited on opposite surfaces of a transparent substrate comprising:
   a laser beam, one or more lenses configured and positioned for focusing the laser beam to a first position, and for adjusting the position of the focal spot of the laser beam between the first position through the transparent substrate to a second position, means for holding a substrate in a plane between the first and second position and means for moving the relative positions of the substrate and laser beam in two dimensions within the plane or a plane parallel to it, wherein in use, .the first and second positions coincide with or are adjacent to exposed surfaces of the two transparent electrically conducting layers.

9. An apparatus as claimed in claim 8 wherein a single lens is positioned on the axis of the laser beam between its point of emergence and the focal spot and is configured to be moved along the axis.

10. An apparatus as claimed in claim 8 wherein multiple lenses are positioned on the axis of the laser beam between its point of emergence and the focal spot and are configured to have their separation adjusted along the axis.

11. An apparatus as claimed in claim 8 wherein divergence of the laser beam and hence the position of the focal spot is adjusted by repositioning of one or more lenses in the beam prior to its emergence.

12. An apparatus as claimed in claim 9 comprising two lenses embodied in a telescope.

13. An apparatus as claimed in claim 8 wherein the laser beam is directed through a two axis scanner unit.

14. An apparatus as claimed in claim 13 wherein the scanner is configured to be moved in two orthogonal axes in a plane parallel to the scribed substrate.

* * * * *